United States Patent [19]

Harris

[11] E Re. 30,078

[45] Reissued Aug. 21, 1979

[54] VEHICLE WITH VARIABLE SPEED TRANSMISSION

[75] Inventor: Trevor L. Harris, Costa Mesa, Calif.

[73] Assignee: Harris Dynamics, Costa Mesa, Calif.

[21] Appl. No.: 904,005

[22] Filed: May 8, 1978

Related U.S. Patent Documents

Reissue of:

[64] Patent No.: 3,913,947
Issued: Oct. 21, 1975
Appl. No.: 479,797
Filed: Jun. 17, 1974

[51] Int. Cl.[2] ..... B62M 1/04

[52] U.S. Cl. ..... 280/236; 74/217 B; 280/261

[58] Field of Search ..... 280/236, 261; 74/116, 74/117, 138, 217 B

[56] References Cited

U.S. PATENT DOCUMENTS

| | | | |
|---|---|---|---|
| 1,072,237 | 9/1913 | Johnson et al. | 74/117 |
| 1,929,058 | 10/1933 | Enard | 74/116 |
| 3,003,358 | 10/1961 | Leonard | 74/116 |
| 3,213,697 | 10/1965 | Hartmann et al. | 74/117 |

FOREIGN PATENT DOCUMENTS

| | | | |
|---|---|---|---|
| 822931 | 11/1951 | Fed. Rep. of Germany . | |
| 324896 | 10/1902 | France | 280/236 |
| 981625 | 1/1951 | France | 74/217 B |
| 1028996 | 5/1953 | France . | |
| 1067935 | 6/1954 | France . | |
| 253348 | 6/1926 | Italy | 74/217 B |
| 417183 | 1/1947 | Italy | 74/217 B |
| 6346 | 9/1895 | Sweden | 280/236 |
| 439540 | 12/1935 | United Kingdom | 74/217 B |

*Primary Examiner*—Albert J. Makay
*Assistant Examiner*—Terrance L. Siemens
*Attorney, Agent, or Firm*—Gordon L. Peterson

[57] ABSTRACT

A vehicle adapted to move along a supporting surface comprising a frame, a wheel having a centrally located hub mounted on the frame for rotational movement about a first rotational axis relative to the frame, and an inner rotatable member at least partially within the hub. The inner rotatable member is mounted for rotational movement about a second rotational axis. The inner rotatable member and the hub are movable relative to each other along a path having a radial component to permit adjustment in the relative radial position of the first and second rotational axes. The hub and the inner rotatable member are drivingly interconnected by a mechanism which includes a one-way clutch. The operator of the vehicle can adjust the relative radial position of the rotational axes to thereby adjust the drive ratio between the hub and the inner rotatable member.

32 Claims, 8 Drawing Figures

VEHICLE WITH VARIABLE SPEED TRANSMISSION

Matter enclosed in heavy brackets [ ] appears in the original patent but forms no part of this reissue specification; matter printed in italics indicates the additions made by reissue.

BACKGROUND OF THE INVENTION

If a bicycle is to be used for touring or over hilly terrain, a variable speed transmission is essential. Unfortunately, none of the prior art systems performs satisfactorily.

For example, one of the most common variable speed transmissions employs a chain and a series of sprockets of different diameters. The chain can be moved by the rider from one sprocket to another to change the drive ratio. With this system, drive ratio selection is difficult to accurately select because the chain may skip over the desired sprocket. Moreover, the chain may be "thrown". At the very best this requires manual placement of the chain over one of the sprockets, and under certain circumstances, the back wheel may lock and cause damage to the bicycle and injury to the rider.

Numerous attempts have been made to overcome these disadvantages. For example, another system uses a complex planetary gear system to provide only three different drive ratios. Generally none of these other systems provides an inexpensive and reliable variable speed transmission which is capable of providing many different drive ratios.

SUMMARY OF THE INVENTION

The present invention provides a variable speed transmission which generally solves the problems noted above. In addition, the present invention provides infinite drive ratio adjustment rather than proportionate drive ratio adjustment. A high ratio change is also obtainable.

One feature of the invention is the incorporation of a transmission of the type described in my copending application Ser. No. 468,412, filed on May 19, 1974, and entitled "Variable Speed Transmission" into a vehicle such as a bicycle. This variable speed transmission provides infinite ratio adjustment and does not require shifting of a chain from one sprocket to another.

A substantial portion of the variable speed transmission can be located within the hub of one of the wheels of the vehicle, such as the rear wheel. The hub protects the transmission against damage and tends to exclude dirt and other contaminants from the working portions of the transmission. In addition, the portion of the transmission within the hub does not introduce any imbalance into the wheel or the vehicle.

With a portion of the transmission within the hub, the hub may be used as part of the transmission. By using the hub as a part of the variable speed transmission, the number of transmission parts is reduced. Thus, the hub in addition to performing its usual functions, also serves as a working transmission part as well as a housing for at least a portion of the variable speed transmission.

More specifically, the variable speed transmission may include, in addition to the hub, an inner rotatable member at least partially within the hub. Means are provided for mounting the inner rotational member for rotation about a rotational axis. The inner rotatable member and the hub are movable relative to each other along a path having a radial component to permit adjustment in the relative radial position of the rotational axes of the inner rotatable member and the hub. The inner rotatable member and the hub are drivingly interconnected by means which may include at least one one-way clutch. Means operable by the operator of the vehicle are provided for adjusting the relative radial position of the rotational axes so that the drive ratio between the hub and the inner rotatable member can be varied by the operator.

Either the hub or the inner rotatable member may serve as a driving member of the transmission. However, if the hub is to serve its usual purposes, then the inner rotatable member should be the driving member and the hub should be the driven member.

The inner rotatable member can be mounted in different ways, and in a preferred construction it is mounted for rotation on a mounting arm lying at least substantially outside of the hub. The mounting arm is movable, as by pivoting, to thereby move the axis of the inner rotatable member radially relative to the axis of the hub. The mounting arm may mount the inner rotatable member at two spaced locations to provide substantial support for the inner rotatable member. A driving element such as a sprocket can be mounted on the inner rotatable member between the two spaced locations.

The hub has an end wall with an opening therein through which the inner rotatable member projects. The opening is sufficiently large to accommodate the radial movement of the inner rotatable member. To protect the portions of the variable speed transmission housed by the hub, flexible seal means are provided between the inner rotatable member and the hub for sealing this opening. The flexibility of the seal means allows it to accommodate the radial movement of the inner rotatable member.

The present invention also provides means for retaining the inner rotatable member in any selected position alongs its path. Although such means may take different forms, it may advantageously include an elongated member drivingly coupled to the variable speed transmission means and extending to a location accessible to the operator, a substantially fixed member mounted on the frame, and a locking element adapted to be wedged between at least portions of the members to hold the elongated member in position. This maintains the drive ratio established by the transmission substantially constant. The operator can selectively release the locking element from wedging engagement with the members to thereby permit the operator to adjust the drive ratio established by the transmission.

Although the present invention can be used with many different kinds of vehicles, it is particularly adapted for use with two or three wheeled land vehicles, such as bicycles and motorcycles. The present invention is highly versatile in that it can be incorporated into a standard crank pedalled bicycle and into a vertically pedalled bicycle. In a vertically pedalled bicycle, the pedals are mounted on levers which in turn are mounted on the frame for oscillatory movement.

When the present invention is incorporated into a vertically pedalled bicycle, the transmission means may include means driven by one or both of the oscillatory levers for varying the drive ratio between such levers and the wheel of the bicycle as a function of the angular position of such lever about its pivot axis. Such means may include a cam having an appropriate contour.

Thus, the transmission means includes a transmission unit or portion variable by the rider and another portion variable as a function of lever angle. Another feature of this invention is that the portion controlled by the rider is driven by the portion responsive to lever angle. With this arrangement, manual shifting of the transmission does not upset or change the cam function.

The invention can best be understood by reference to the following description taken in connection with the accompanying illustrative drawings.

DESCRIPTION OF THE PREFERRED EMBODIMENTS

Figure 1:
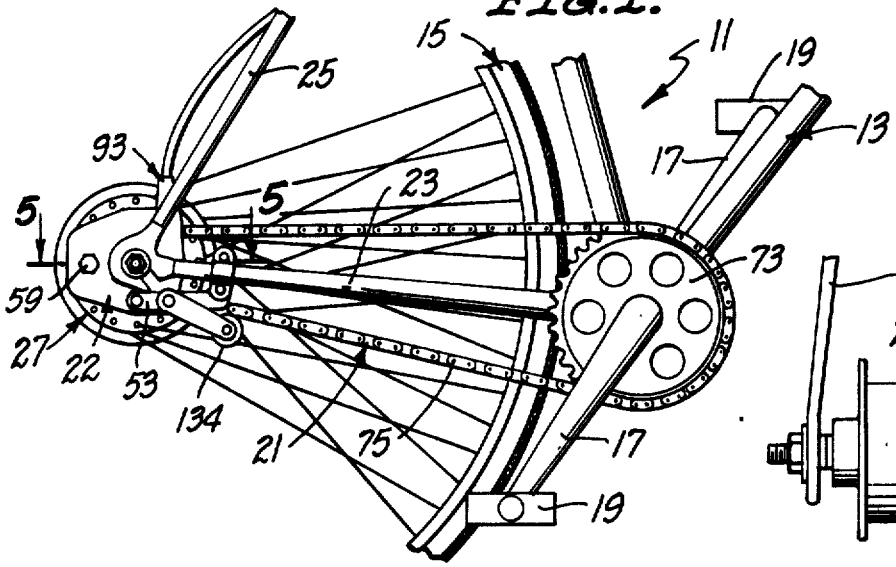
FIG. 1 is a fragmentary side elevational view of a bicycle constructed in accordance with the teachings of this invention.

FIG. 1 shows a bicycle 11 which includes a frame 13 and a rear wheel 15. The bicycle 11 is of the crank pedalling type and includes a pair of cranks 17 rotatably mounted on the frame 13 in a conventional manner and carrying pedals 19, respectively. Power is transmitted from the pedals 19 by way of a variable speed transmission 21 to the rear wheel 15. The transmission 21 includes a transmission unit 22 which enables the rider to change drive ratios. Except for the transmission 21, its cooperation with the remainder of the bicycle 11, and the control means for the transmission, the bicycle 11 may be of standard construction and includes the usual nonillustrated components, such as a front wheel, a seat, and handle bars.

Figure 2:
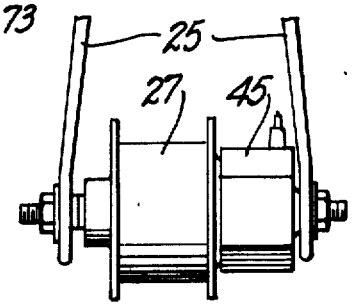
FIG. 2 is a rear elevational view of the hub and adjacent structure with the wheel spokes removed for clarity.
Figure 5:
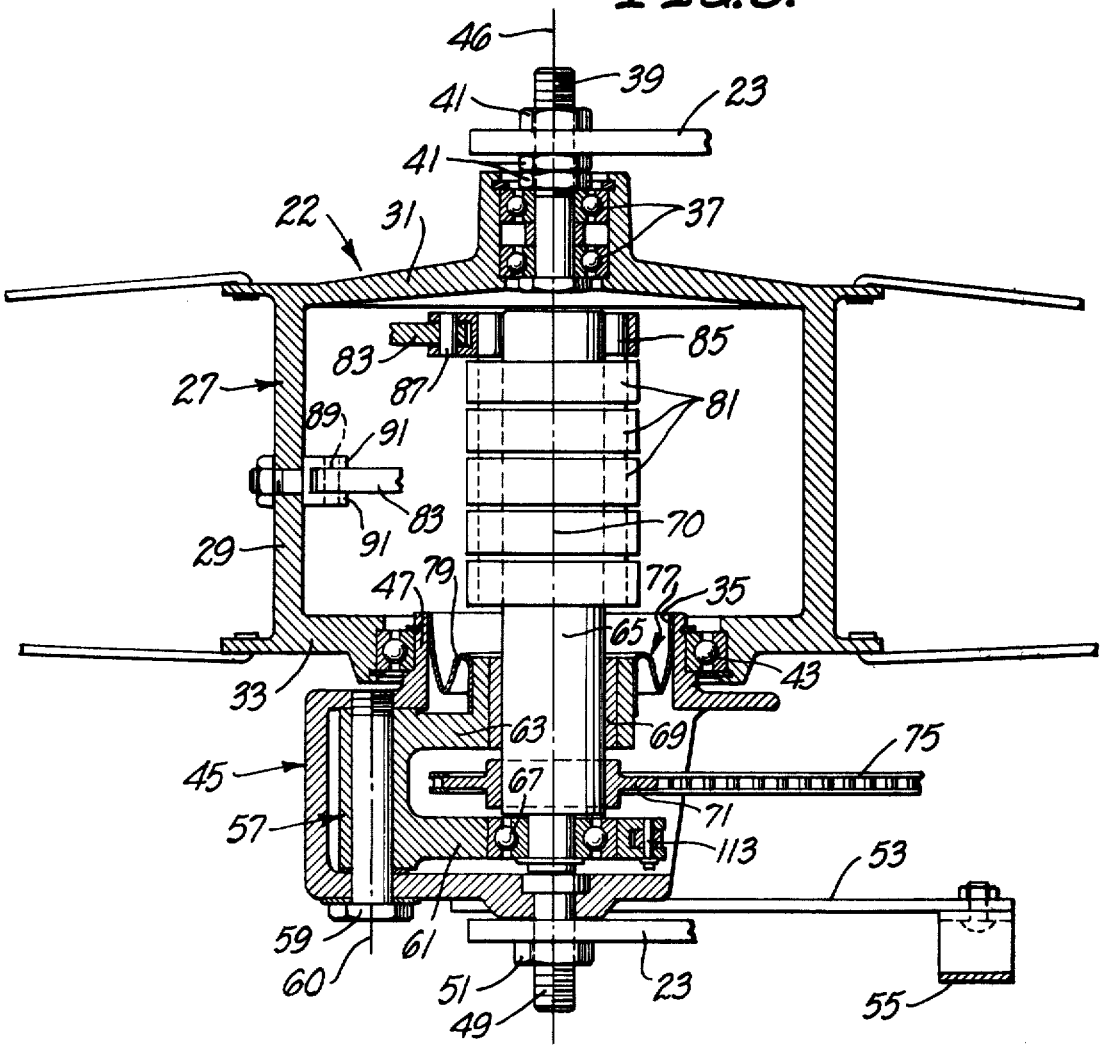
FIG. 5 is an enlarged sectional view taken generally along line 5—5 of FIG. 1.

The frame 13 includes longitudinal frame members 23 and diagonal frame members 25 (FIGS. 1, 2, and 5). The rear wheel 15 is mounted on and between the frame members 23 and 25 for rotation about a rotational axis.

More specifically, the wheel 15 includes a centrally located hub 27 which also forms a portion of the transmission unit 22. The hub 27 includes a peripheral wall 29 (FIG. 5) and opposite end walls 31 and 33. The end wall 33 has an opening 35. The hub 27 is rotatably mounted at one end by bearings 37 mounted in the end wall 31 and a bolt 39 mounted in the bearings 37 and attached to the frame members 23 and 25 by any suitable means such as nuts 41.

The hub 27 is mounted at the other end by a bearing 43 and an open ended housing 45. The housing 45 has a collar 47 on which the bearings 43 is mounted. When so mounted the hub 27 rotates about a central rotational axis 46. The housing 45 is mounted on the frame members 23 and 25 by a suitable fastener such as a bolt 49 and a nut 51. The housing 45 is prevented from rotating by an arm 53 which is suitably attached at one end to the housing and at the other end to one of the frame members 23 by a clamp 55.

The transmission unit 22 includes a mounting arm 57 mounted on the housing 45 for movement along a path by any suitable means such as a fastener 59. Although the mounting arm 57 could undergo other kinds of motion relative to the housing 45, in the embodiment illustrated, the mounting arm is mounted for pivotal movement about a pivot axis 60.

Although various constructions can be employed, in the embodiment illustrated, the mounting arm 57 includes two spaced mounting sections 61 and 63. The transmission unit 22 includes an inner rotatable member 65 mounted on bearings 67 and 69 carried by the mounting sections 61 and 63, respectively. The bearings 67 and 69 mount the inner rotatable member 65 for rotation about a central rotational axis 70 lying parallel to the rotational axis 46 and to the pivot axis 60. By moving the mounting arm 57 about its pivot axis 60, the axis 70 is moved radially relative to the axis 46. In one angular position of the mounting arm 57 about its pivot axis 60, the rotational axes 46 and 70 are coincident.

The inner rotatable member 65 is driven in any suitable manner by a drive member such as by a sprocket 71 which is fixedly mounted on the inner rotatable member 65 intermediate the mounting sections 61 and 63. The sprocket 71 is driven by the cranks 17 by way of a larger diameter sprocket 73 (FIG. 1) and a chain 75. One end of the housing 45 is opened to accommodate the chain 75.

The opening 35 is of sufficient area so as to accommodate the movement of the inner rotatable member 65 with the mounting arm 57 along the path. A flexible seal 77 is attached to the collar 47 and to the mounting section 63 so as to seal the opening 35. In order to accommodate radial movement of the inner rotatable member 65, the seal 77 is flexible and may be of generally bellows-like construction. In the embodiment illustrated the seal 77 includes at least one fold 79.

Means are provided for drivingly interconnecting the inner rotatable member 65 and the hub 27. Such means in the embodiment illustrated includes a plurality of one-way clutches 81 and a plurality of drive elements 83. One of the drive elements 83 is provided for each of the one-way clutches 81. Any number of the clutches 81 can be provided in the six clutches illustrated in FIG. 5 are purely illustrative. However, the linearity of the output will generally improve as the number of the clutches 81 is increased.

The one-way clutches 81 are arranged in an axially extending row on the inner rotatable member 65. The clutches 81 are concentric with the inner rotatable member 65 and may be of identical, conventional construction. Each of the one-way clutches 81 is arranged to drive in one direction and free wheel in the other direction. The one-way clutches 81 are arranged on the inner rotatable member 65 so that all of them drive in the same direction. Each of the one-way clutches 81 may be of any construction which drives in one direction and allows relative motion in the opposite direction. For example, each of the clutches 81 may be of the Sprag or roller type, each of which has internal members 85 which grip the inner rotatable member 65 in the driving direction to form a driving connection between the clutch and the inner rotatable member and which allows free wheeling in the other direction to permit relative angular motion between the clutch and the inner rotatable member in the opposite direction.

Although the drive elements 83 could be of various different constructions, in the embodiment illustrated, each of the drive elements is in the form of a rigid link pivotally coupled by a pin 87 to flanges on the associated clutch 81. The flanges on the one-way clutches 81 are spaced circumferentially, and in the embodiment illustrated are equally spaced circumferentially when the rotational axes 46 and 70 coincide.

Similarly, the outer ends of the drive elements 83 are pivotally coupled to the peripheral wall 29 of the hub 27 by pins 89 which extend through pairs of flanges 91 suitably mounted on the peripheral wall. The location of the attachments of the drive elements 83 to the peripheral wall 29, i.e., the center lines of the pins 89 are spaced apart circumferentially equal distances which is 60° in the embodiment illustrated. In the embodiment illustrated, the axes of the pivotal attachments between the drive elements 83 and the clutches 81 and the peripheral wall 29 are parallel to the rotational axes 46 and 70.

Thus, the hub 27 serves as an outer rotatable member for the transmission 21. The use of the inner rotatable member 65, the one-way clutches 81, the drive elements 83, and an outer rotatable member may be carried out substantially in accordance with my copending application Ser. No. 468,412 referred to above.

The radial spacing between the rotational axes 46 and 70 of the inner rotatable member 65 and the hub 27 can be varied by pivoting the mounting arm 57 about its pivot axis. This also moves the inner rotatable member 65 along an arcuate path to bring about adjustment in the relative radial positions of the rotational axes of the inner rotatable member and the hub. Various control means, such as the control means 93 can be provided for selectively moving and releasably fixing the mounting arm 57 and the inner rotatable member 65 in any one of a plurality of positions along such path.

Figure 4:
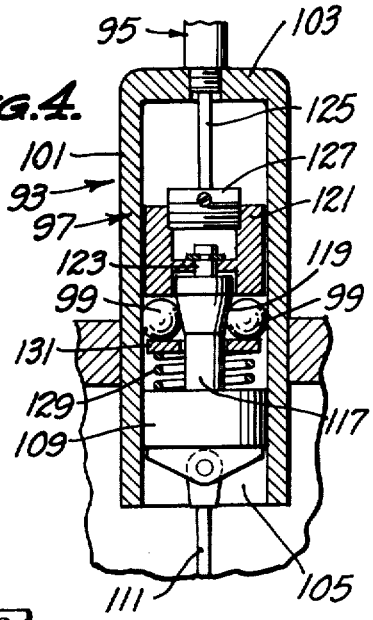
FIG. 4 is an enlarged, fragmentary, sectional view of one preferred mechanism for retaining the inner rotatable member in position.
Figure 3:
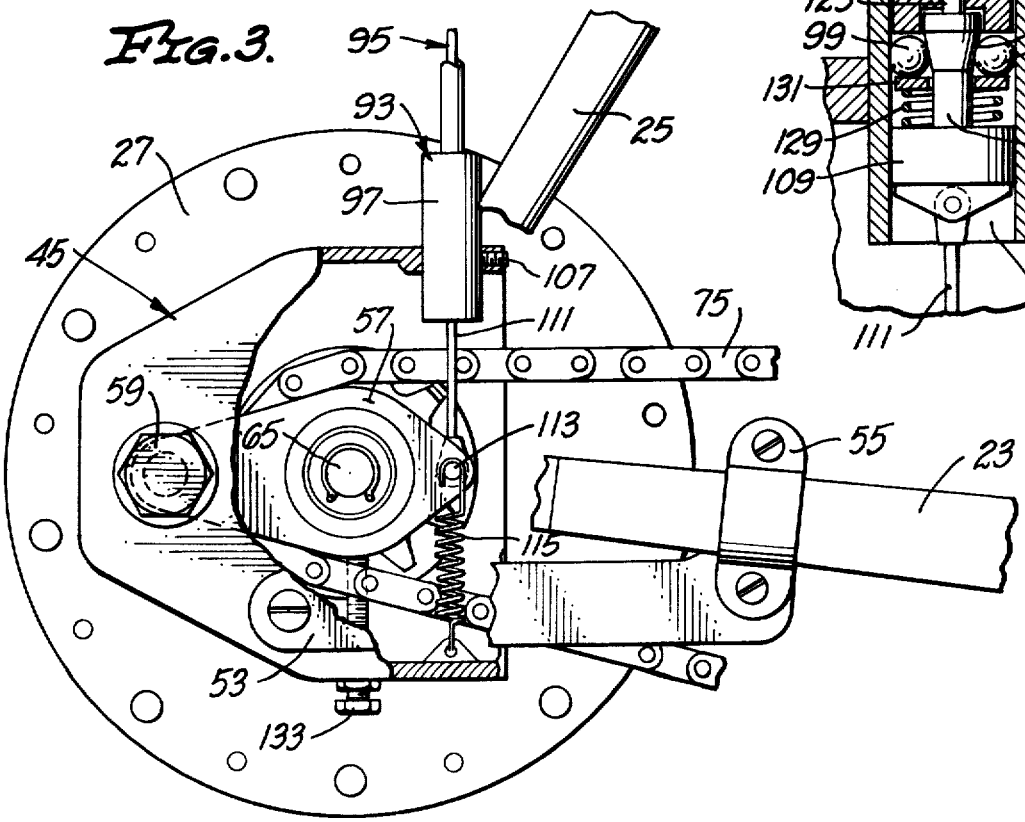
FIG. 3 is an enlarged, fragmentary, side elevational view partly in section of the hub and adjacent structure.

Although the control means 93 may take different forms, in the embodiment illustrated it includes elongated means or an elongated member 95 extending from the outer end of the mounting arm 57 to a suitable location accessible to the rider of the bicycle 11, a substantially fixed member in the form of a housing member 97, and a plurality of locking elements 99 (FIG. 4). Although the housing 97 could be of various different constructions, in the embodiment illustrated, it is in the form of an elongated tube having a peripheral wall 101, an end wall 103, and an open end 105. The housing 97 extends through an opening in the housing 45 and is retained therein by any suitable means such as a set screw 107 (FIG. 3).

The elongated member 95 includes a plunger 109 slidable within the housing 97 and a flexible cable 111 pivotally coupled at one end to the plunger and at the other end to the outer end of the mounting arm 57 in any suitable manner such as by a pin 113. The mounting arm 57 is biased clockwise as viewed in FIG. 3 by a spring 115 which is attached at one end to the pin 113 and at the other end to the housing 45. The elongated member 95 also includes a stem 117 attached to, and coaxial with, the plunger 109 and having a frustoconical ramp surface 119 which extends radially outwardly as it extends away from the cable 111. A release member 121 of generally annular configuration in plan is attached to an extension 123 of the stem 117 for limited axial sliding movement on the stem. The elongated member 95 also includes a push pull cable 125 attached at one end by a threaded plug 127 to the release member 121 and extending to a location accessible to the rider of the bicycle 11.

In the embodiment illustrated, the locking elements 99 are in the form of balls. Any number of the locking elements 99 may be provided. The locking elements 99 are resiliently urged upwardly along the ramp surface 119 by a coil compression spring 129 which bears at one end on the plunger 109 and at the other end on a washer 131 which is slidably mounted on the plunger 117.

The housing 97 and the elements within the housing constitute releasable locking means. The releasing locking means is, in effect, a linear one-way clutch which locks the mounting arm 57 against clockwise movement. Specifically, the spring 129 urges the locking elements 99 upwardly along the ramp surface 119 to wedge the locking elements between the peripheral wall 101 and the ramp surface. Any downwardly directed force on the cable 111 tends to wedge the locking elements 99 more tightly between the ramp surface 119 and the peripheral wall 101. Consequently, downward movement of the cable 111 and clockwise pivotal movement (as viewed in FIG. 3) of the mounting arm 57 are prevented. Any upward force on the cable 111 will not be transmitted to the plunger 109 because the cable 111 is flexible.

Counterclockwise movement of the mounting arm 57 as viewed in FIG. 3 is resisted by the spring 115. In the embodiment illustrated, counterclockwise pivotal movement of the mounting arm 57 as viewed in FIG. 3 is also resisted by the inherent tendency of the inner rotatable member 65 to seek a position coaxial with the hub 27 and by the chain 75 when the bicycle is being driven by the chain. An adjustable stop in the form of a screw 133 (FIG. 3) is attached to the lower wall of the housing 45 and projects upwardly so that it will engage the lower edge of the mounting arm 57 when the inner rotatable member 65 is coaxial with the hub 27. Thus, in the embodiment illustrated, all of the drive ratios other than 1 to 1 are provided by raising the axis 70 of the inner rotatable member 65 above the axis 46 of the hub 27. Of course, the transmission unit 22 may be constructed so that shifting may be accomplished by moving the inner rotatable member 65 downwardly from its coaxial position with the hub 27, if desired.

To pivot the mounting arm 57 counterclockwise, the rider manipulates a lever (not shown) in a conventional manner so as to exert a pulling force on the cable 125. This force is transmitted through the release member 121 to the stem 117 and plunger 109 to move the stem and plunger upwardly as viewed in FIG. 4. The locking elements 99 allow such upward movement in that such upward movement of the ramp surface 119 tends to reduce the wedging effect against the locking elements. The upward movement of the plunger 109 is transmitted through the cable 111 to the mounting arm 57 to pivot the latter counterclockwise as viewed in FIG. 3 against the biasing action of the spring 115. When the desired position of the mounting arm 57 is reached, upward movement of the cable 125 is terminated and this allows the spring 129 to again tightly wedge the locking elements 99 between the ramp surface 119 and the peripheral wall 101.

Although other arrangements can be used, in the embodiment illustrated, the spring 115 is operative to pivot the mounting arm 57 clockwise when the rider of the bicycle 11 releases the releasable means 93. This is accomplished by the rider exerting a pushing force on the push pull cable 125. This pushing force pushes the release member 121 downwardly a limited distance along the extention 123 and into contact with the locking elements 99 to urge them down the ramp surface 119. This releases the stem 117, the plunger 109, and the cable 111 for downward movement. Accordingly, the spring 115 pivots the mounting arm 57 clockwise as viewed in FIG. 3 to the extent that the rider moves the plunger 117 downwardly.

In operation of the bicycle 11, rotation of the cranks 17 drives the sprocket 71 through the sprocket 73 and the chain 75. This in turn rotates the inner rotatable member 65 which drives the hub 27 through the one-way clutches 81 and the drive elements 83. The ratio of angular displacement of the inner rotatable member 65 to angular displacement of the hub 27 can be varied by adjusting the relative radial position of the axes 46 and 70. When the axes 46 and 70 are coincident, the drive ratio is 1 to 1 and as the rotational axis 70 is displaced radially from the rotational axis 46, the drive ratio increases. As the mounting arm 57 and hence the inner rotatable member 65 can assume an infinite number of different positions relative to the hub 27, an infinite number of drive ratios is obtainable.

The relative radial positions of the axes 46 and 70 can be established by the rider as discussed above by utilizing the releasable means 93 or by any other suitable means for adjusting the angular position of the mounting arm 57. The details of the manner in which the inner rotatable member 65, the one-way clutches 81, the drive elements 83, and the hub 27 cooperate to provide an infinite number of drive ratios is explained in my copending application Ser. No. 468,412 referred to above.

Pivotal movement of the mounting arm 57 will have a minimal effect on the required length of chain 75. However, an idler 134 (FIG. 1) may be provided, if desired, to tension the chain 75.

Figure 6:
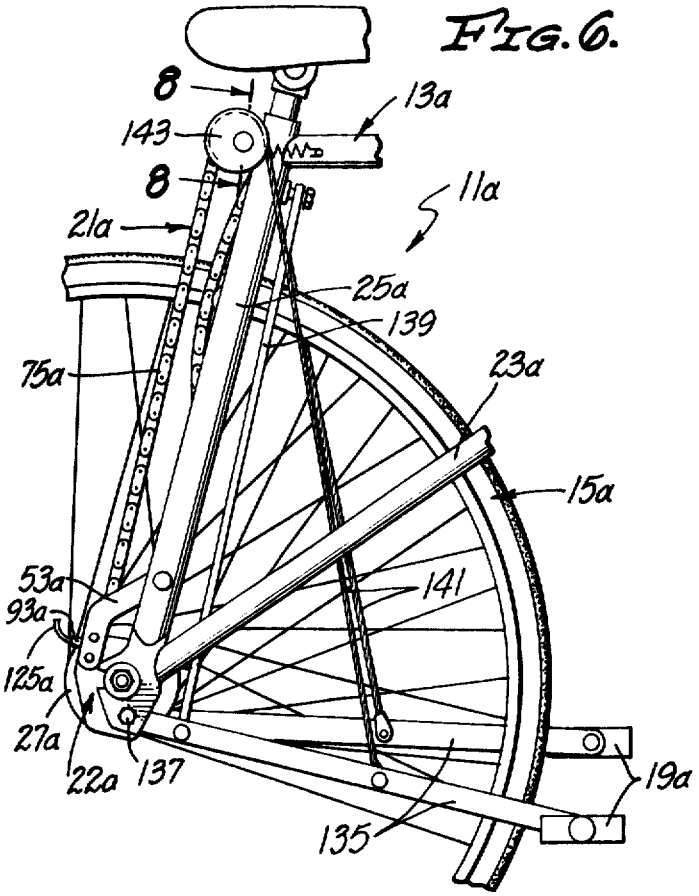
FIG. 6 is a fragmentary side elevational view of a vertically pedalled bicycle constructed in accordance with the teachings of this invention.
Figure 7:
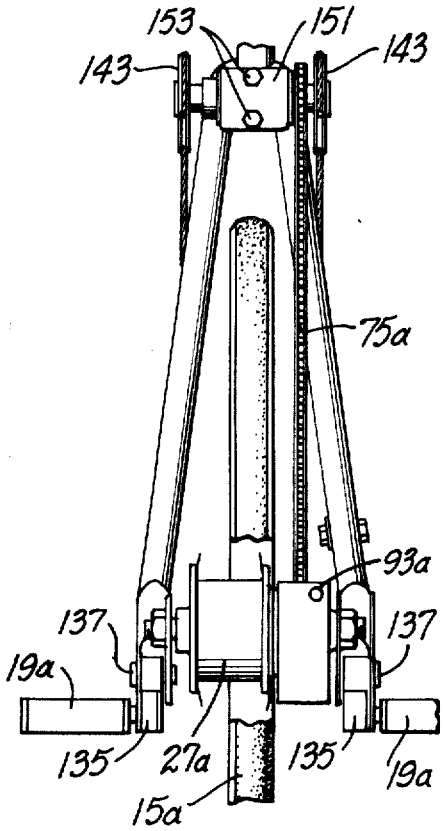
FIG. 7 is a rear elevational view of the bicycle of FIG. 6.
Figure 8:
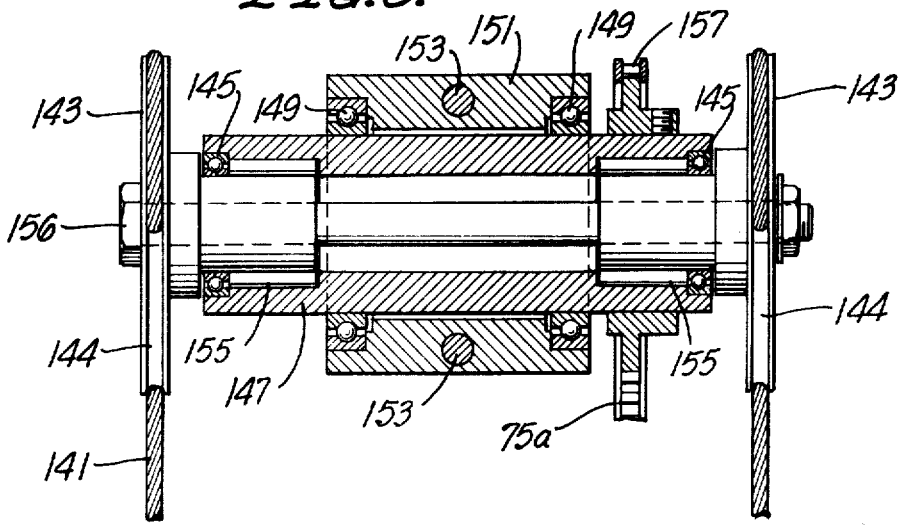
FIG. 8 is an enlarged sectional view taken generally along line 8—8 of FIG. 6.

FIGS. 6–8 show a vertically pedalled bicycle 11a constructed in accordance with the teachings of this invention. Except as noted specifically herein, the bicycle 11a is identical to the bicycle 11 and corresponding portions are designated by corresponding reference numerals followed by the letter a.

The bicycle 11a has a frame 13a which may be of the type shown in my copending application Ser. No. 315,497, filed Dec. 15, 1972, and entitled "Velocipede". The frame 13a has frame members 23a and 25a to which the rear wheel 15a is attached in the same manner shown in FIGS. 1–5.

The bicycle 11a is manually powered by levers 135 which are mounted on the frame 13a by pins 137 for oscillatory movement about such pins with the axis of the oscillatory movement being parallel to, and closely adjacent the axis of the wheel 15a. A suitable linkage 139 is coupled to both of the levers 135 and to the frame member 25a to positively interconnect the levers. This assures that when one of the levers 135 is moving on its downward stroke, the other lever 135 will be moving on its upward stroke. The linkage 139 may be substantially as disclosed in my copending application Ser. No. 315,497 referred to above.

A transmission 21a transmits power from the pedals 19a to the rear wheel 15a. The transmission 21a includes cables 141 attached at their lower ends to the levers 135, respectively, and at their upper ends to cams 143, respectively. Each of the cables 141 is wrapped partly around the associated cam 143. Each of the cams 143 has a periphery 144 which is appropriately configured so that the drive ratio between the associated lever 135 and the transmission unit 22a varies as a function of the angular position of such lever. The contour of the peripheries 144 can be selected to tailor this drive ratio to the particular results desired. The cams 143 are returned by return springs 142 (only one being shown in FIG. 6) attached to the cams, respectively, and to the frame 13a.

Each of the cams 143 is rotatably mounted by a bearing 145 in a shaft 147 having an axial stepped bore extending through it. The shaft 147 is in turn rotatably mounted by bearings 149 for rotation within a block 151 which is attached to the frame 13a in any suitable manner such as by screws 153.

The cams 143 are drivingly coupled to the shaft 147 by one-way clutches 155, respectively, and are held therein by a bolt 156. Each of the one-way clutches 155 is arranged so that it is in a driving mode when the associated lever 135 is on its downward stroke and is in a free-wheeling mode when the associated lever is on its upward stroke. Accordingly, the shaft 147 is driven unidirectionally and alternately by the levers 135.

To transmit the rotational movement of the shaft 147 to the rear wheel 15a, a sprocket 157 is suitably affixed to the shaft 147 and an endless chain 75a cooperates with the sprocket 157 and a transmission unit 22a which may be substantially identical to the transmission unit 22 shown in FIG. 5. The chain 75a drives a sprocket (not shown) corresponding with the sprocket 71 shown in FIG. 5. Accordingly, rotational input is provided to the transmission unit 22a which functions in the manner described above to drive the rear wheel 15a.

The transmission unit 22a is prevented from rotating by an arm 53a which is attached to the frame member 25a. The transmission unit 22a is rotated approximately 70° counterclockwise from the position occupied by the transmission unit 22.

In operation of the bicycle 11a, oscillation of the levers 135 drives the cams 143. Each of the levers 135 drives the associated cam 143 on its downward stroke and the cam is return by the associated return spring 142 during the upward stroke of the associated lever. The shaft 147 is driven unidirectionally and alternately by the cams 143 through the associated one-way clutches 155. The rotational motion of the shaft 147 is transmitted to the transmission unit 22a by way of the sprocket 157 and the chain 75a.

With the bicycle 11a, the transmission unit 22a permits the rider to select a drive ratio and the cams 143 provide drive ratio variation as a function of angular position of the levers 135. One feature of the invention is that the cams 143 drive the transmission unit 22a so that the cam function is not altered by the drive ratio changes in the transmission unit.

Although exemplary embodiments of this invention have been shown and described, many changes, modifications and substitutions my be made by those with ordinary skill in the art without necessarily departing from the spirit and scope of this invention.

I claim:

1. A vehicle adapted to a move along a supporting surface comprising:

a frame;

at least one wheel, said wheel having a centrally located hub;

first means cooperable with the hub for mounting the wheel on the frame for rotational movement relative to the frame about a first rotational axis, said wheel being adapted to roll along the supporting surface;

an inner rotatable member at least partially within said hub;

second means for mounting said inner rotatable member for rotational movement about a second rotational axis, said inner rotatable member and said hub being relatively movable along a path having a radial component to permit adjustment in the relative radial position of the first and second rotational axes;

drive means including at least one one-way clutch and at least one drive element for drivingly coupling said inner rotatable member to said hub, said one-way clutch and said drive element being within said hub, said drive element being drivable along a path which circumscribes the inner rotatable member;

*means including a drive member outside said hub* for imparting input motion to [at least one of said hub and] said inner rotatable member; and means operable by the operator of the vehicle for [adjusting] *moving said inner rotatable member and said drive member to adjust* the relative radial position of said rotational axes whereby the drive ratio between said hub and said inner rotatable member can be varied by the operator.

2. A vehicle as defined in claim 1 wherein said one one-way clutch is a first one-way clutch, said drive means including a second one-way clutch, said first and second one-way clutches being mounted on said inner rotatable member.

3. A vehicle as defined in claim 1 wherein said second means includes a mounting arm lying at least substantially outside of said hub, said inner rotatable member being rotatably mounted on said mounting arm for rotational movement about said second rotational axis, said mounting arm being movable to change the relative radial position of said first and second rotatable axes, said imparting means driving said inner rotatable member.

4. A vehicle as defined in claim 3 including means for pivotally mounting said mounting arm.

5. A vehicle as defined in claim 3 wherein said mounting arm rotatably supports the inner rotatable member at least at first and second spaced locations along the inner rotatable member, said imparting means includes a member mounted on said inner rotatable member between said first and second locations.

6. A vehicle as defined in claim 1 wherein said hub has an end wall with an opening therein, said inner rotatable member projects through said opening and is movable along said path, said opening being sufficiently large to accommodate the movement of said inner rotatable member along said path, and flexible seal means between the inner rotatable member and the hub for sealing said opening and for accommodating the movement of said inner rotatable member along said path.

7. A vehicle as defined in claim 1 wherein said imparting means includes a lever mounted for oscillatory movement about a pivot axis and having means to cooperate with the foot of the operator to permit the lever to be pivoted about such pivotal axis, third means for varying the drive ratio between said lever and said one of said inner rotatable member and said hub as a function of the angular position of said lever about said pivot axis, and means for drivingly interconnecting said third means and said one of said inner rotatable member and said hub whereby said third means can drive said one of said inner rotatable member and said hub.

8. A vehicle as defined in claim 1 wherein said second means mounts said inner rotatable member for movement along said path, said adjusting means includes a fixed member, an elongated member drivingly coupled to said inner rotatable member and extending through said fixed member, and at least one locking element adapted to be wedged between at least portions of said members whereby said elongated member and said inner rotatable member can be held in a selected position, and means for permitting the operator to selectively release the locking element to allow movement of said elongated member to adjust the radial position of the inner rotatable member relative to the hub.

9. A vehicle adapted to move along a supporting surface comprising:

a frame;

at least one wheel, said wheel having a centrally located hub;

first means cooperable with the hub for mounting the wheel on the frame for rotational movement relative to the frame about a first rotational axis, said wheel being adapted to roll along the supporting surface;

said hub having an end wall with an opening therein;

an inner rotatable member extending through said opening and into said hub;

means for mounting said inner rotatable member for rotational movement about a second rotational axis and for movement along a path to permit adjustment in the relative radial position of the rotational axes;

drive means for drivingly coupling the inner rotatable member to the hub;

said opening in the end wall of said hub being sufficiently large to accommodate the movement of the inner rotatable member along said path;

flexible seal means between the inner rotatable member and the hub for sealing said opening and for accommodating the movement of said inner rotatable member along said path;

means for driving the inner rotatable member; and means operable by the operator of the vehicle for moving the inner rotatable member along said path whereby the drive ratio between the hub and the inner member can be varied.

10. A wheeled vehicle adapted to be propelled by a rider comprising:

a frame;

a front wheel rotatably mounted on said frame;

a rear wheel rotatably mounted on said frame;

a first lever mounted on said frame for oscillatory movement about a first pivotal axis;

a second lever mounted on said frame for oscillatory movement about a second pivotal axis;

each of said levers having means adapted to cooperate with a foot of the rider to pivot such lever about its pivotal axis;

transmission means for drivingly coupling said levers to one of said wheels whereby the oscillatory motion of the levers drives said one wheel;

said transmission means including first means driven by said first lever for varying the drive ratio between the first lever and said one wheel as a function of the angular position of said first lever about said first pivotal axis; and said transmission means including second means driven by said first means for varying the drive ratio between the second means and said one wheel and control means operable by the rider for controlling said second means whereby the rider can selectively adjust the drive ratio.

11. A wheeled vehicle as defined in claim 10 wherein said one wheel includes a centrally located hub, at least a substantial portion of said second means being housed by said hub.

12. A wheeled vehicle as defined in claim 10 wherein said first means includes a cam, a shaft rotatably mounted on said frame, and means including a one-way clutch for rotatably mounting said cam on said shaft, and said transmission means includes means for drivingly coupling said shaft to said second means.

13. A vehicle adapted to move along a supporting surface comprising:

a frame;

at least one wheel;

means for mounting the wheel on the frame for rotational movement relative to said frame about a first rotational axis, said wheel being adapted to roll along the supporting surface;

an input member;

means for mounting the input member on the frame for movement relative to the frame;

transmission means for drivingly interconnecting the input member and said wheel so that movement of the input member drives said wheel;

said transmission means including means for varying the drive ratio between said input member and said wheel;

control means operable by the operator of the vehicle for adjusting said transmission means to thereby adjust said drive ratio;

said control means including an elongated member drivingly coupled to the transmission means and extending to a location accessible to the operator, a substantially fixed member mounted on said frame, and a locking element adapted to be wedged between at least portions of said members to thereby hold the elongated member in position to maintain the drive ratio established by the transmission means substantially constant; and said control means including means operable by the operator for releasing the locking element from wedging engagement with said members to thereby permit the operator to adjust the drive ratio established by the transmission means.

14. A vehicle as defined in claim 13 wherein said releasing means includes at least a portion of the elongated member between the fixed member and said location.

15. A vehicle as defined in claim 13 wherein said fixed member includes a housing member, said elongated member extending through said housing member, at least one of said housing member and elongated member having a ramp surface thereon, and means for driving said locking element up said ramp surface to thereby lock the elongated member to the fixed member.

16. A vehicle as defined in claim 13 wherein said wheel includes a centrally located hub and at least a substantial portion of said transmission means is housed in said hub.

17. A vehicle as defined in claim 1 wherein said inner rotatable member includes a shaft extending into said hub, said imparting means includes a drive member mounted on and drivingly coupled to said shaft, and said adjusting means adjusts the radial position of said shaft.

18. A vehicle as defined in claim 17 wherein said hub has opposite ends, said first means includes third means for rotatably mounting one end of said hub on said frame and fourth means for mounting the other end of said hub on said frame, said fourth means including a nonrotatable member outside of said shaft.

19. A vehicle as defined in claim 18 wherein said nonrotatable member at least partially houses said second means.

20. A vehicle as defined in claim 1 wherein said one-way clutch is mounted on the inner rotatable member and said drive element drivingly couples the one-way clutch to the hub.

21. A vehicle as defined in claim 1 wherein said hub has a peripheral wall and said drive means extends generally radially outwardly from said inner rotatable member to said peripheral wall.

22. A vehicle adapted to move along a supporting surface comprising:

a frame;

at least one wheel, said wheel having a centrally located hub;

first means cooperable with the hub for mounting the wheel on the frame for rotational movement relative to the frame about a first rotational axis, said wheel being adapted to roll along the supporting surface;

a shaft at least partially within said hub, said shaft having a central axis;

second means for mounting said shaft for rotational movement about a second rotational axis, said second rotational axis and said central axis being substantially coincident, said shaft and said hub being relatively movable along a path having a radial component to permit adjustment in the relative radial position of said first and second rotational axes;

drive means including at least one one-way clutch for drivingly coupling said [inner rotatable member] *shaft* to said hub;

a drive member mounted on the shaft *outside said hub* for driving said shaft; and means for adjusting the radial position of said shaft to adjust the drive ratio between said hub and said shaft.

*23. A vehicle as defined in claim 22 wherein said drive member includes a first sprocket outside said hub and wherein said vehicle includes a second sprocket rotatably mounted on said frame and a chain drivingly engaging said first and second sprockets whereby the second sprocket can drive said first sprocket.*

*24. A vehicle as defined in claim 22 wherein said second mounting means mounts said shaft in cantilever fashion whereby a length of said shaft from said second mounting means through a first end of said shaft is unsupported, said length of said shaft projects into said hub and has said one-way clutch mounted thereon.*

*25. A vehicle as defined in claim 22 wherein said hub has opposite ends with an opening at least at one of said ends, said shaft projects through said opening so that a first portion of said shaft lies outside of said hub and a second portion of said shaft lies inside said hub, said second mounting means including a mounting member, bearing means for mounting said mounting member on said hub adjacent said one end of said hub, a mounting arm, means*

*for mounting said mounting arm on said mounting member for pivotal movement about a third axis radially displaced from said second rotational axis, and means for mounting said inner rotatable member on said mounting arm for rotational movement about said second rotational axis.*

*26. A vehicle adapted to move along a supporting surface comprising:*

*a frame;*

*at least one wheel, said wheel having a centrally located hub;*

*said hub having an end wall;*

*first means cooperable with the hub for mounting the wheel on the frame for rotational movement relative to the frame about a first rotational axis, said wheel being adapted to roll along the supporting surface;*

*an inner rotatable member at least partially within said hub;*

*second means for mounting said inner rotatable member for rotational movement about a second rotational axis, said inner rotatable member and said hub being relatively movable along a path having a radial component to permit adjustment in the relative radial position of the first and second rotational axes;*

*said inner rotatable member extending toward said end wall, said inner rotatable member and said second mounting means terminating short of said end wall;*

*drive means including at least one one-way clutch and at least one drive element for drivingly coupling said inner rotatable member to said hub, said one-way clutch and said drive element being within said hub, said drive element being drivable along a path which circumscribes the inner rotatable member;*

*means for imparting input motion to at least one of said hub and said inner rotatable member; and*

*means operable by the operator of the vehicle for adjusting the relative radial position of said rotational axes whereby the drive ratio between said hub and said inner rotatable member can be varied by the operator.*

*27. A vehicle as defined in claim 26 wherein said imparting means imparts input motion to said inner rotatable member.*

*28. A vehicle as defined in claim 26 wherein said imparting means includes a drive member outside said hub for imparting input motion to said inner rotatable member and said adjusting means moves the inner rotatable member and said drive member to adjust the relative radial position of said rotational axes.*

*29. A vehicle as defined in claim 28 wherein said second mounting means supports the inner rotatable member on one side of said one-way clutch means and said inner rotatable member is unsupported on the other side of said one-way clutch means and radially inwardly of said one-way clutch means.*

*30. A vehicle as defined in claim 26 wherein said hub has an end opposite said end wall and said second means mounts the inner rotatable member on said end of said hub whereby said inner rotatable member is unsupported by said end wall of said hub.*

*31. A vehicle adapted to move along a supporting surface comprising:*

*a frame;*

*at least one wheel, said wheel having a centrally located hub;*

*first means cooperable with the hub for mounting the wheel on the frame for rotational movement relative to the frame about a first rotational axis, said wheel being adapted to roll along the supporting surface;*

*an inner rotatable member at least partially within said hub;*

*second means for mounting said inner rotatable member for rotational movement about a second rotational axis, said inner rotatable member and said hub being relatively movable along a path having a radial component to permit adjustment in the relative radial position of the first and second rotational axes;*

*drive means including at least one one-way clutch and at least one drive element for drivingly coupling said inner rotatable member to said hub, said one-way clutch and said drive element being within said hub, said drive element being drivable along a path which circumscribes the inner rotatable member;*

*said second mounting means supporting said inner rotatable member on one side of said at least one one-way clutch whereby the inner rotatable member is unsupported radially inwardly of said one-way clutch and on the other side of said one-way clutch;*

*means for imparting input motion to at least one of said hub and said inner rotatable member; and*

*means operable by the operator of the vehicle for adjusting the relative radial position of said rotational axes whereby the drive ratio between said hub and said inner rotatable member can be varied by the operator.*

*32. A vehicle adapted to move along a supporting surface comprising:*

*a frame;*

*at least one wheel, said wheel having a centrally located hub;*

*first means cooperable with the hub for mounting the wheel on the frame for rotational movement relative to the frame about a first rotational axis, said wheel being adapted to roll along the supporting surface;*

*an inner rotatable member at least partially within said hub;*

*second means for mounting said inner rotatable member in cantilever fashion whereby a length of the first rotatable member is unsupported from said second mounting means through a first end of the first rotatable member, said second means mounting the inner rotatable member for rotational movement about a second rotational axis and for movement along a path having a radial component to permit adjustment in the relative radial position of the first and second rotational axes;*

*at least a portion of said length of said first rotatable member being within said hub;*

*drive means including at least one one-way clutch and at least one drive element for drivingly coupling said length of said inner rotatable member to said hub, said one-way clutch and said drive element being within said hub, said drive element being drivable along a path which circumscribes said length of the inner rotatable member;*

*means for imparting input motion to said hub; and*

*means operable by the operator of the vehicle for moving the inner rotatable member to adjust the relative radial position of said rotational axes whereby the drive ratio between said hub and said inner rotatable member can be varied by the operator.*

* * * * *